United States Patent

Salvetat et al.

[11] Patent Number: 5,854,367
[45] Date of Patent: Dec. 29, 1998

[54] PROCESS FOR CATIONIC POLYMERIZATION

[75] Inventors: Jacques Salvetat, La Crêche; Annick Debrésie, Domont, both of France

[73] Assignee: Arizona Chemical Company, Panama City, Fla.

[21] Appl. No.: 721,554

[22] Filed: Sep. 26, 1996

[51] Int. Cl.$^6$ .................................. C08F 12/08; C08F 4/14
[52] U.S. Cl. ................ 526/347.1; 526/135; 526/194; 526/216; 526/221; 526/237; 526/238; 526/280; 526/281; 526/283; 526/346; 526/347; 525/98; 528/392
[58] Field of Search ..................... 526/216, 237, 526/238, 348.7, 332, 283, 135, 194, 280, 281, 346, 347, 347.1; 528/392; 525/211, 216, 219, 233, 98

[56] References Cited

U.S. PATENT DOCUMENTS

| | | | |
|---|---|---|---|
| 3,932,332 | 1/1976 | Douglas et al. | 260/28.5 A |
| 3,959,238 | 5/1976 | Hokama et al. | 526/237 X |
| 4,306,049 | 12/1981 | Prapas | 526/347 |
| 4,360,628 | 11/1982 | Runavot et al. | 524/508 |
| 4,389,334 | 6/1983 | Weinert, Jr. et al. | 252/429 B |
| 4,533,700 | 8/1985 | Mizui et al. | 525/285 |
| 4,657,706 | 4/1987 | Durkee | 260/104 |
| 4,732,936 | 3/1988 | Holohan, Jr. | 526/347 X |
| 4,910,321 | 3/1990 | Kennedy et al. | 549/213 |
| 5,051,485 | 9/1991 | Schmid et al. | 526/237 X |
| 5,140,080 | 8/1992 | Chang | 525/539 |
| 5,177,163 | 1/1993 | Chu et al. | 526/237 X |

OTHER PUBLICATIONS

Hackh's Chemical Dictionary (4th ed.) McGraw–Hill, N.Y., p. 509 (1969).

Primary Examiner—Fred Teskin
Attorney, Agent, or Firm—Luedeka Neely & Graham P.C.

[57] ABSTRACT

The specification discloses a process for cationic polymerization of vinyl aromatic monomers, adhesive compositions containing polymers made by the process and use of the polymers as processing aids for thermoplastic polymers. In the process, a vinyl aromatic monomer is dissolved in an organic solvent containing a complex comprising an in situ formed ester of an unsaturated carboxylic acid and a Lewis acid to provide a polymer having a softening point above about 125° C. and a polydispersity index above about 2.0. Surprisingly, the Lewis acid/acrylate complex causes the reaction to proceed with reduced exothermicity and enables an increase in the softening point and yield as compared with a polymer made without the complex or using other complexes.

40 Claims, No Drawings

PROCESS FOR CATIONIC POLYMERIZATION

FIELD OF THE INVENTION

The invention relates to a process for cationic polymerization of primarily aromatic hydrocarbon monomers and to a resin made by the process which is useful as a processing aid for thermoplastic polymers.

BACKGROUND

Cationic polymerization processes for olefinic monomers are classified as polyadditions in which the growing monomer is electrophilic, that is, it has an affinity or attraction for electrons. The polymerization reactions are generally conducted using Friedel-Crafts catalysts and they proceed very rapidly with significant exothermicity. The heat of reaction can be so high that it disaffects the properties of the resulting polymer, and it is therefore necessary in many cases to withdraw heat from the reaction environment by circulating a cooling medium within or adjacent the environment to accelerate heat transfer from the reaction mass. For some monomer species such as vinyl aromatics, it is very difficult to remove sufficient heat without using expensive refrigeration measures and even these are sometimes inadequate to maintain the necessary control to achieve desired properties.

Typically, catalysts for cationic polymerizations are Lewis acids, which means they are electron acceptors. The double bonds of the olefinic monomers used for making hydrocarbon resins are sites from which electrons can be shared with an electrophilic agent. Hence, the olefinic monomers may be considered to be bases with respect to the electrophilic agent.

Various methods are known for the polymerization of vinyl aromatic monomers. U.S. Pat. No. 3,932,332 to Douglas et al. discloses a process for cationic copolymerization of monomers of alpha-methyl styrene and styrene. The monomers are blended with a solvent and reacted in the presence of a Friedel-Crafts catalyst such as boron trifluoride. In order to obtain the desired polymerization product, the temperature of the reaction is carefully controlled and maintained within close limits throughout the time of the reaction. Under these conditions, the resulting copolymers typically have a Ring-and-Ball softening point of from about 70° C. to about 100° C. However, because the reaction is highly exothermic, it is not always possible to control the reaction temperature. As a result, the products often exhibit significant variations in properties such as the softening point and molecular weight distribution.

U.S. Pat. No. 4,360,628 to Runavot et al. describes solid polymer tackifying resins based on copolymers of dicyclopentadiene, a vinyl aromatic hydrocarbon and a substituted benzene having 1 to 3 lower alkyl, hydroxyl or halogen substituents and adhesive formulations containing these resins. According to Runavot et al., tackifying resins containing about 0.01 to about 0.25 moles of $C_1$–$C_{12}$-alkyl esters of unsaturated carboxylic acids per mole of dicyclopentadiene are preferred, in particular alpha-beta-unsaturated acids such as acrylic acid and methacrylic acid. Boron trifluoride or a boron trifluoride diether complex may optionally be used. The process requires tight control of the reaction rate in order to maintain suitable reaction temperatures, and the resulting resins exhibit significant color and relatively low softening points with relatively low yields.

U.S. Pat. No. 4,910,321 to Kennedy et al. describes use of a catalyst composed of a complex of an organic acid or its ester and a Lewis acid, preferably boron trichloride or boron trifluoride, to make living polymers from olefinic monomers. The esters used in the complex of Kennedy et al. are saturated esters such as t-butylacetate which promote a living polymerization reaction in order to make long chain polymers. By the Kennedy et al. living polymerization process, the polymers generally have a polydispersity index of less than about 2.0. However, the ester complexes disclosed by Kennedy et al. are not suitable for cationic polymerization reactions at temperatures above the decomposition temperature of the complex since saturated esters tend to act as catalyst poisons.

As exemplified by the foregoing, a number of different polymerization techniques are known for making specific polymers, yet there remains a need for an improved polymerization technique for unsaturated hydrocarbon compounds which provides a polymerization product having a relatively high softening point useful as a reinforcing resin in adhesive formulations. There is also a need for a cationic polymerization process for unsaturated hydrocarbons which is relatively easy to control.

Accordingly, it is an object of the invention to provide an improved process for polymerizing unsaturated hydrocarbon monomers.

It is a further object of this invention to provide a cationic polymerization process for polymerizing unsaturated hydrocarbon monomers which is relatively easy to control as compared with known processes.

It is also an object of this invention to provide polymeric resins which are useful as processing aids and plasticizers for thermoplastic polymers such as polyethylene, polyvinyl chloride and polystyrene.

A further object of the present invention is to provide polymeric compositions based on vinyl aromatic hydrocarbon monomers which exhibit improved properties.

An additional object of the invention is to provide improved resins which are usseful as reinforcing resins in adhesive formulations.

SUMMARY OF THE INVENTION

With regard to the above and other objects, the present invention provides a process for cationic polymerization of vinyl aromatic monomers. According to one aspect of the invention, a vinyl aromatic monomer is dissolved in an organic solvent which contains a catalyst complex comprising an ester of an unsaturated carboxylic acid and a Lewis acid. During the polymerization reaction, the monomer is reacted in the solvent containing the complex to produce a resin having a softening point above about 125° C., a number average molecular weight in the range of from about 1100 to about 4000 and a polydispersity index of from about 2.0 to about 4.5. The resins of the invention, when blended with A-B-A block copolymers having elastomeric mid blocks and styrenic end blocks, enable a significant increase in the upper service temperatures of adhesives based on these copolymers. For use in adhesive formulations as an end block reinforcing resin, it is preferred that the polymeric resin have a softening point above about 150° C.

Preferably, the Lewis acid/ester complex is formed in situ as the reaction progresses by bubbling $BF_3$ gas-phase acid into the solvent solution of monomers containing the unsaturated ester. The introduction of the Lewis acid into the solution in this manner has the unexpected effect of causing the reaction to proceed with reduced exothermicity. Because the exothermicity of the process is lower, the reaction may be conducted safely at more economically acceptable reaction temperatures without the need for expensive refrigeration and control measures. Furthermore, unlike products made with living catalysts, the polymeric compositions made by the present invention are random polymeric species having a polydispersity index of greater than about 2.0 and relatively high softening points which makes them more effective when used with commercially important styrenic A-B-A block copolymers used in adhesive applications and as processing aids for thermoplastic polymers.

In another embodiment, the invention provides a process for making a cationically polymerized resin in which styrene or alpha-methyl styrene is dissolved in an aromatic solvent and reacted in the presence of an in situ formed complex of 2-ethylhexyl acrylate, butylacrylate or butyl methacrylate and boron trifluoride. The resin made by the process exhibits a Ring-and-Ball softening point of from about 125° and to about 200° C., a number average molecular weight in the range from about 1100 to about 4000, a Gardner color of below about 1, and imparts improved cohesiveness to hot melt adhesive formulations. The resins typically have a polydispersity index greater than about 2.0.

DETAILED DESCRIPTION

In known cationic polymerization processes, special measures are required to control the reaction in order to obtain acceptable results because cationic polymerization reactions are highly exothermic. Surprisingly, the present process is not highly exothermic so that expensive temperature control methods are avoided resulting in a much simpler and more cost effective process. This limited exothermicity is particularly beneficial for large batch reactions where adequate cooling of the entire reaction mass during the reaction may be difficult.

An important feature of the invention is the cationic polymerization of vinyl aromatic monomers in the presence of an in situ formed complex comprising an ester of an unsaturated carboxylic acid and a Lewis acid, preferably with the monomer dissolved in an aromatic solvent. The process according to the invention results in polymers having a number average molecular weight in the range of from about 1100 to about 4000, a Ring-and-Ball softening point between 125° C. and 200° C. and a Gardner color of less than 1. Because the process involves a reduced rate of heat generated by the reaction, a higher concentration of the monomers may be used in the solvent.

Furthermore, the polymerization reaction may be carried out at relatively high temperatures in the range of from about 10° C. to about 40° C. without poisoning the catalyst. Thus, according to the invention, highly reactive vinyl aromatic monomers which have previously required much lower reaction temperatures to build the desired molecular weight, for example lower than 0° C., may now be cationically polymerized at temperatures which are significantly higher (up to about 50° C.) and which do not require elaborate temperature control methods, and the resulting polymers also exhibit higher softening points.

Lewis acids which may be used to make the catalyst complex include, but are not limited to, $BF_3$, $BCl_3$, $AlCl_3$, $AlBr_3$, $TiCl_4$, $SnCl_4$, alkyl aluminum chlorides, and certain activated clays such as attapulgite and montmorillonite. The preferred Lewis acids are $BF_3$ and $BCl_3$.

The ester of the complex may be selected from the $C_1$–$C_{10}$ alkyl esters of unsaturated carboxylic acids. Accordingly, the esters may be made by esterification of an unsaturated carboxylic acid with a $C_1$–$C_{10}$ alcohol. Suitable unsaturated carboxylic acids include, but are not limited to, acrylic acid, methacrylic acid, maleic acid and fumaric acid. The esters of the complex therefore may include, but are not limited to, methyl acrylate, ethyl acrylate, butyl acrylate, butyl methacrylate, isobutyl methacrylate, and 2-ethylhexyl acrylate. In the preferred embodiment, the esters are selected from the group consisting of 2-ethylhexyl acrylate, butyl acrylate and butyl methacrylate or mixtures thereof. Of these esters, 2-ethylhexyl acrylate is the most preferred.

The molar ratio of ester to Lewis acid may vary widely. However, an advantageous ratio is between about 0.5:1.0 and about 5.0:1.0. In the preferred embodiment the ratio is between about 1:1 and about 3:1. A ratio higher than 5.0:1.0 may be used but is not likely to provide any additional advantage with regard to reaction temperature control. It is therefore not desirable to use a ratio higher than about 5.0:1.0 from an economical point of view.

The complex is preferably $BF_3$-acrylate complex selected from the class consisting of $BF_3$-2-ethylhexyl acrylate, $BF_3$-butyl acrylate, $BF_3$-butyl methacrylate and mixtures thereof, with $BF_3$-2-ethylhexyl acrylate being most preferable.

The amount of catalyst complex used to control the reaction exothermicity may range from about 0.1 to about 5% by weight relative to the weight of monomer in the reaction mass. The preferred amount of the catalyst complex relative to the monomer ranges from about 0.7 to about 4.0 wt. %, and is most preferably about 3 wt. %.

The process according to the invention may be used to polymerize or copolymerize a wide variety of aromatic and olefinic compounds and mixtures of aromatic and olefinic compounds. For example, vinyl aromatic monomers, dicyclopentadiene compounds, terpene compounds, ethylene monomers, isobutylene monomers and vinyl ethers may be polymerized using the process of the invention alone or together as copolymers.

The vinyl aromatic monomers which may be polymerized by the process of the invention include, but are not limited to, styrene, alpha-methylstyrene, ortho-methylstyrene, meta-methylstyrene, para-methylstyrene, vinyltoluene, indene and methylindene and mixtures thereof. In a preferred embodiment, the vinyl aromatic monomer is styrene, alpha-methylstyrene and/or vinyltoluene.

Examples of dicyclopentadiene compounds which may be polymerized by the process described herein include substituted and unsubstituted dicyclopentadiene. The substituents are preferably chosen from $C_1$–$C_{12}$ alkyl groups, most preferably $C_1$–$C_4$ alkyl groups which provide less stearic hindrance.

Exemplary terpene compounds which may be polymerized according to the invention include alpha-pinene, beta-pinene, limonene, Δ-2- and Δ-3-carene, and dipentene.

In addition to the aromatic and olefinic monomers polymerized by the process of the invention, a phenolic compound in an amount less than about 3% by weight relative to the other monomers may be copolymerized therewith without adversely affecting the advantages of the invention. In excess of about 3% phenolic compound by weight in the reaction mass is generally to be avoided as it has been found to destabilize or interfere with formation of the Lewis acid/ester complex. Phenolic compounds which may be copolymerized include phenol, cresol, diphenol or trialkylphenol and alkoxyphenol. The phenolic compounds may be alkylated by aromatic monomers and terpenes which improve the resin's compatibility with ethylene vinyl acetate copolymers.

It is preferred to conduct the process with the monomer dissolved in an organic solvent. Suitable organic solvents may be selected from aliphatic or aromatic hydrocarbons. Preferably, hexane, heptane, pentane, toluene or xylene are used and of these toluene is generally the solvent of choice. In general, the amount of solvent used is that which is sufficient to substantially dissolve the monomer, and, depending on the monomer, this may range from about 0.3 to about 2.0 parts of solvent per part of monomer. For example when using styrene or alpha-methylstyrene as the monomer it is preferable to use toluene as the solvent in the range of from about 0.45 to about 1.0 part of solvent per part of monomer with about 1.0 part of solvent per part of monomer being preferred.

When an aromatic solvent is used, a trace portion of the solvent may be incorporated in the polymer in an amount which is substantially less than about 1% by weight. The amount of solvent incorporated in the polymer depends on a number of factors, most importantly the temperature.

The polymerization time is not believed to be critical to achieve the desired resin. Accordingly, the polymerization time may range from about of 0.5 to about 10 hours. It is preferred, however, to conduct the polymerization reaction for no more than about 4 hours depending on the size of the reaction mass and scale of reaction.

Depending on the monomer, it may be desirable to conduct the reaction under an inert gas atmosphere such as nitrogen or argon gas. For example, when dicyclopentadiene is used it is preferred to employ a nitrogen blanket over the reactants to avoid problems which may result from exposure of the reactants and/or products to oxygen. In general, the reaction may be conducted under a relatively low pressure. Accordingly, a high pressure reaction vessel is not required for the process.

After the polymerization reaction is substantially complete, the catalyst complex may be removed from the reaction mass product in order to give a clear, stable resin. Removal of the complex may be achieved by decomposing the complex and removing the components using one or more hot water washes and a dilute alkaline solution. Preferably, the first wash is hot water only, optionally containing a small amount of glycerol (generally about 0.05 wt. %), for removal of the Lewis acid component. The amount of water may range from 2 to 50 wt. % based on the weight of reaction product solution. Generally, about 14–15 wt. % water is sufficient. Washing is effected at a temperature of about 80° C. while stirring the reaction product.

After the first wash, the aqueous phase is separated from the reaction product or organic phase and the latter is washed a second time with a mixture of 2 to 50 wt. % water, preferably about 14 wt. %, containing an alkaline emulsifier for the ester, preferably about 0.28 wt. % of a 40 wt. % aqueous solution of tetrasodium salt of ethylenediamine tetraacetic acid (commercially available from Manufacture de Produits Chimiques Protex of Paris, France under the tradename MASQOL EL40). The amount of water and emulsifier is based on the weight of reaction product solution. A small amount of glycerol may also be used in the second wash step.

Alternatively, the ester may be removed from the reaction mass after removal of the acid by treatment with ammonia and the resulting mixture filtered using activated carbon as an absorbent. Accordingly, the reaction mass may be washed after removal of the acid using a mixture of about 14 wt. % water and about 0.05 wt. % ammonia based on the weight of reaction product solution.

Accordingly, in a preferred procedure the first washing step is conducted with about 14 wt. % water and about 0.05 wt. % glycerol based on the weight of reaction product solution at 80° C. for about 30 minutes while stirring the materials. The aqueous phase is then separated from the organic phase. The reaction product solution (organic phase) is then washed with a mixture of about 14 wt. % water and about 0.28 wt. % of an aqueous solution of about 40 wt. % tetrasodium salt of ethylenediamine tetraacetic acid based on the weight of the reaction product solution. The second washing step is conducted for about 30 minutes at about 80° C. while stirring the reaction product solution. The aqueous phase is then separated from the organic phase. Finally, unreacted monomer and solvent may be removed from the organic phase by vacuum distillation.

The cationically polymerized materials produced according to the present invention are useful in many applications including, but not limited to, coatings, printing inks, sealants, construction adhesives, pressure sensitive adhesives and assembly adhesives. The polymers of the invention may also be used as processing aids and plasticizers for thermoplastic polymers such as polyethylene, polyvinyl chloride and polystyrene. For many of these applications, the polymer should have excellent compatibility with other polymers such as, for example, styrene butadiene rubber, ethylene-vinyl acetate copolymer, polychloroprene, natural rubber, polystyrene and synthetic rubber.

Another commercially important use of the product of the present invention is in hot melt glues and adhesives. In particular, the polymers made by the invention may be used to reinforce the end blocks of A-B-A block copolymer-based hot melt glues and adhesives, thereby raising the upper service temperatures of the materials, particularly those which comprise an A-B-A block copolymer having styrenic end blocks and an elastomeric mid block. The amount of A-B-A block copolymer in the adhesive composition may range from about 20 wt. % to about 40 wt. % while the additive of the invention may be present in an amount ranging from about 15 wt. % to about 25 wt. % of the total formulation weight. The adhesive composition may also include a tackifier resin such as a hydrocarbon, polyterpene or rosin ester resin which may be present in an amount ranging from about 20 wt. % to about 60 wt. % as well as other minor ingredients which may be selected from extender oils, pigments, fillers, stabilizers. The minor ingredients of the adhesive composition may be present in an amount ranging from about 1 wt. % to about 20 wt. % of the total adhesive composition weight.

As a processing aid, the polymers made by the invention may be used to reduce composite-metal friction during molding or extrusion, to provide inter-chain lubrication of thermoplastic polymers and to improve the viscoelastic and melt elongation properties of thermoplastic polymers such as polystyrene and acrylic resins. Accordingly, from about 1 to about 5 weight percent of the polymers made by the invention, based on the total thermoplastic composition weight, may be combined with a thermoplastic polymer composition in an extruder. A typical thermoplastic composition may contain flame retardants, antioxidants, fillers, UV stabilizers, impact modifiers and the like.

Additional aspects of the invention will now be illustrated with reference to the following non-limiting examples in which all temperatures are in degrees Celcius and all percentages are by weight unless indicated otherwise.

In the examples, the Ring-and-Ball softening points were measured in accordance with ASTM E28/92 and the Gardner color was determined in accordance with ASTM D/1544.80.

EXAMPLE 1

Styrene, 50 parts by weight, and 50 parts by weight alpha-methylstyrene were mixed with 3 parts by weight 2-ethylhexyl acrylate and the mixture was dissolved in 100 parts by weight toluene. Subsequently 0.2% gaseous boron trifluoride based on the weight of monomer was added to the reaction mixture by bubbling the boron trifluoride through the reaction mixture with a dip tube. The mixture was then polymerized for 3 hours at 18° C. using cooling water having a temperature of 10° C. After the polymerization was complete, the reaction product solution was contacted with 14 wt. % water based on the weight of reaction product solution at a temperature of 80° C. for 30 minutes to deactivate and solubilize the $BF_3$ component of the catalyst. The aqueous phase was then decanted from the organic phase which contained the reaction product solution. A second wash was conducted with 14 wt. % water and 0.28 wt. % MASQOL EL 40 for 30 minutes at 80° C. to remove the acrylate, and the organic phase was separated by decanting. Volatiles were distilled from the reaction product solution at 220° C. under a blanket of nitrogen and a vacuum of 60 mm Hg. A resin having a Ring-and-Ball softening point of 137° C. and a Gardner color below 1 was obtained. Product yield was 95%.

EXAMPLE 2

Styrene, 50 parts by weight, and 50 parts by weight alpha-methylstyrene were mixed and the mixture was dissolved in 100 parts by weight toluene. No 2-ethylhexyl acrylate was used for this example. Gaseous boron trifluoride, 0.2 wt. % based on the weight of monomer, was added to the reaction mixture by bubbling the boron trifluoride through the reaction mixture with a dip tube. The polymerization reaction was conducted and the product processed as described in Example 1. A resin having a Ring-and-Ball softening point of 105° C. and a Gardner color below 1 was obtained. Product yield was 95%.

EXAMPLE 3

The procedure of Example 1 was repeated with the exception that the ratio of monomers was changed and the reaction temperature was maintained at 10° C. instead of 20° C. Five weight percent butyl methacrylate was used for this example. A resin having a Ring-and-Ball softening point of 151° C. and a Gardner color of less than 1 was obtained. The product yield was 95%.

EXAMPLE 4

Styrene, 20 parts by weight, and 80 parts by weight alpha-methylstyrene were mixed and the mixture was dissolved in 100 parts by weight toluene. No butyl methacrylate was used in this example. Gaseous boron trifluoride, 0.2 wt. % based on the weight of monomer, was added to the reaction mixture by bubbling the boron trifluoride through the reaction mixture with a dip tube. The polymerization reaction was conducted at 10° C. and the product processed as described in Example 1. A resin having a Ring-and-Ball softening point of 128° C. and a Gardner color of less than 1 was obtained. The product yield was 95%.

EXAMPLE 5

Styrene, 10 parts by weight, and 90 parts by weight alpha-methylstyrene were mixed with 5 parts by weight butyl methacrylate and the mixture was dissolved in 100 parts by weight toluene. Gaseous boron trifluoride, 0.2 wt. % based on the weight of monomer, was added to the reaction mixture by bubbling the boron trifluoride through the reaction mixture with a dip tube. The polymerization reaction was conducted at 10° C. and the product processed as described in Example 1. A resin having a Ring-and-Ball softening point of 150° C. and a Gardner color of less than 1 was obtained. The product yield was 5%.

EXAMPLE 6

Styrene, 10 parts by weight and 90 parts by weight alpha-methylstyrene were mixed and the mixture was dissolved in 100 parts by weight toluene. No butyl methacrylate was used in this example. Gaseous boron trifluoride, 0.2 wt. % based on the weight of monomer, was added to the reaction mixture by bubbling the boron trifluoride through the reaction mixture with a dip tube. The polymerization reaction was conducted at 10° C. and the product processed as described in Example 1. A resin having a Ring-and-Ball softening point of 126° C. and a Gardner color of less than 1 was obtained. The product yield was 98%.

EXAMPLE 7

Alpha-methylstyrene, 75 parts by weight and 25 parts by weight of vinyltoluene was mixed with 0.5 parts 2-ethylhexyl acrylate and the mixture was dissolved in 100 parts by weight toluene. Gaseous boron trifluoride, 0.2 wt. % based on the weight of monomer, was added to the reaction mixture by bubbling the boron trifluoride through the reaction mixture with a dip tube. The polymerization reaction was conducted at 10° C. and the product processed as described in Example 1. A resin having a Ring-and-Ball softening point of 163° C. and a Gardner color of less than 1 was obtained. The yield was 92%.

EXAMPLE 8

Alpha-methylstyrene, 75 parts by weight and 25 parts by weight vinyltoluene was mixed and the mixture was dissolved in 100 parts toluene. No 2-ethylhexyl acrylate was used in this example. Gaseous boron trifluoride, 0.2 wt. % based on the weight of monomer, was added to the reaction mixture by bubbling the boron trifluoride through the reaction mixture with a dip tube. The polymerization reaction was conducted 10° C. and the product processed as described in Example 1. A resin having a Ring-and-Ball softening point of 149° C. and a Gardner color of less than 1 was obtained. The product yield was 95%.

EXAMPLE 9

Alpha-methylstyrene, 75 parts by weight, and 25 parts by weight styrene were mixed with 3 parts by weight 2-ethylhexyl acrylate and the mixture was dissolved in 100 parts toluene. Gaseous boron trifluoride, 0.2 wt. % based on the weight of monomer, was added to the reaction mixture by bubbling the boron trifluoride through the reaction mixture with a dip tube. The polymerization reaction was conducted at 20° C. and the product processed as described in Example 1. A resin having a Ring-and-Ball softening point of 125° C. and Gardner color of less than 1 was obtained. The product yield was 98%.

EXAMPLE 10

The process according to Example 9 was repeated except 2-ethylhexyl acrylate was not used. A resin having a Ring-and-Ball softening point of 100° C. was obtained. The product yield was 80%.

EXAMPLE 11

The process according to Example 7 was repeated except that a 50:50 weight ratio of monomers was used along with 5 wt. % butyl methacrylate. A resin having a Ring-and-Ball softening point of 160° C. was obtained. The product yield was 92%.

EXAMPLE 12

The process according to Example 11 was repeated except butyl methacrylate was not used. A resin having a Ring-and-Ball softening point of 150° C. was obtained.

Tables 1 and 2 contain the process conditions and properties of the copolymers made according to Examples 1-12.

co-catalyst or adjuvant during the copolymerization of aromatic monomers which provides copolymers having higher softening points vis-a-vis copolymers made without the use of the co-catalyst. The higher softening point of the copolymers provides resins having higher glass transition temperatures ($T_g$) which, when used in adhesive formulations, results in adhesives which generally have greater shear strength.

Tables 1 and 2 also show the properties of adhesive formulations containing the products of Examples 1–12 contrasted with an adhesive containing ENDEX 160 resin, a commercially available alpha methylstyrene-para methylstyrene copolymer resin available from Hercules Incorporated of Wilmington, Del. The adhesive formulations contained 15 parts by weight of polymer, 15 parts by weight of

TABLE 1

| Reactants (parts by wt.) | Example #1 | Example #2 | Example #3 | Example #4 | Example #5 | Example #6 | ENDEX 160 |
|---|---|---|---|---|---|---|---|
| alpha-methylstyrene | 50 | 50 | 80 | 80 | 90 | 90 | — |
| vinyl toluene | — | — | — | — | — | — | — |
| styrene | 50 | 50 | 20 | 20 | 10 | 10 | — |
| 2-EHA | 3 | — | — | — | — | — | — |
| butyl methacrylate | — | — | 5 | — | 5 | — | — |
| Reaction Temp. (°C.) | 18 | 18 | 10 | 10 | 10 | 10 | — |
| $T_g$ (°C.) | 92 | 59 | 105 | 83 | 108 | 85 | 112 |
| Ring and Ball S.P. (°C.) | 137 | 105 | 151 | 128 | 150 | 126 | 160 |
| Molecular Weight (Daltons) | 2200 | 1372 | 1428 | 875 | 1296 | 718 | 4767 |
| Polydispersity Index | 2.4 | 2.6 | 3.6 | 3.9 | 4.7 | 5.15 | 3.4 |
| Shear Test at 75° C. (hours) | 9 | 4.5 | 19 | 10 | 38 | 23 | 7 |
| Loop Tack (N/25 mm) | 26.6 | 19.5 | 22.5 | 22.1 | 17.7 | 17.6 | 22.1 |
| Adhesion (N/25 mm) | 20.5 | 23.8 | 20.52 | 13.6 | 16.7 | 19.7 | 15 |

TABLE 2

| Reactants (parts by wt.) | Example #7 | Example #8 | Example #9 | Example #10 | Example #11 | Example #12 | ENDEX 160 |
|---|---|---|---|---|---|---|---|
| alpha-methylstyrene | 75 | 75 | 75 | 75 | 50 | 50 | — |
| vinyl toluene | 25 | 25 | 25 | 25 | 50 | 50 | — |
| styrene | — | — | — | — | — | — | — |
| 2-EHA | — | — | 3 | — | — | — | — |
| butyl methacrylate | 5 | — | — | — | 5 | — | — |
| Reaction Temp. (°C.) | 10 | 10 | 20 | 20 | 10 | 10 | — |
| $T_g$ (°C.) | 114 | 106 | 79 | 53 | 114 | 104 | 112 |
| Ring and Ball S.P. (°C.) | 163 | 149 | 125 | 100 | 160 | 150 | 160 |
| Molecular Weight (Daltons) | 2153 | 1576 | 1127 | 578 | 3661 | 2277 | 4767 |
| Polydispersity Index | 3.75 | 3.6 | 2.5 | 3.3 | 3.1 | 3.6 | 3.4 |
| Shear Test at 75° C. (hours) | 39 | 22 | 3 | 0.3 | 12 | 14 | 7 |
| Loop Tack (N/25 mm) | 19.9 | 22.8 | 24.9 | 22.9 | 16.1 | 14.5 | 22.1 |
| Adhesion (N/25 mm) | 19.5 | 20.2 | 28.4 | 25 | 17.5 | 16.6 | 15 |

As illustrated in the foregoing tables, resins made by the process of the invention using the in-situ generated unsaturated ester-Lewis acid complex have softening points in the range of from about 125° C. to about 185° C. and the reaction temperature is relatively easy to control with cooling water at temperatures ranging from about 3° C. to about 20° C. In the absence of the complex, the softening points of the polymers are considerably lower, and the yield is generally lower as well.

The foregoing tables therefore show the surprisingly superior effectiveness of using an unsaturated ester as a PRIMOL 352 (an aliphatic oil commercially available from Exxon Corporation of Houston, Tex.), 45 parts by weight ESCOREZ 1310 (a hydrocarbon resin commercially available from Exxon Chemical Company of Houston, Tex.) and 25 parts by weight of KRATON D-1 107 (an A-B-A styrene-isoprene-styrene block copolymer, commercially available from Shell Chemical Company of Houston, Tex., wherein the styrene blocks had a number average molecular weight of about 10,000 and the isoprene block had a number average molecular weight of about 125,000).

As shown in the tables by a comparison of shear test values for adhesive formulations containing the indicated copolymers, the benefits of using the process of the invention to produce copolymers having higher softening points are manifest in formulations made with resins derived from alpha-methylstyrene/styrene mixtures having weight ratios of from about 50:50 to about 90:10 (Table 1) and for resins derived from alpha-methyl styrene/vinyltoluene mixtures which contain predominantly alpha-methylstyrene (Table 2).

Although the resin of Example 11 prepared from a 50:50 weight ratio mixture of alpha-methylstyrene and vinyltoluene has a higher softening point and $T_g$ when prepared in the presence of 5 wt. % butyl methacrylate (Example 11), this resin does not necessarily impart superior shear strength to adhesive formulations when contrasted with a similar resin prepared in the absence of co-catalyst (Example 12). It is believed the lower shear performance values are a result of use of a lower amount of alpha-methylstyrene than in Examples 7–10. Nevertheless, adhesive formulations containing the copolymers made by the process of the invention generally have superior adhesion and shear properties compared to adhesives containing the commercial resin ENDEX 160.

EXAMPLES 13–17

To further illustrate the advantages of the invention with respect to the use of an unsaturated ester/complex, the polymerization reaction of Example 1 was repeated with 5 wt. % ester and compared with various other complexing agents. The results are given below in Table 3.

TABLE 3

| Ex. No. | Styrene (parts by wt.) | Alpha-methyl-Styrene (parts by wt.) | Ester used in catalyst complex | Yield (%) | Ring and Ball Softening Point (°C.) | Molecular Weight (Daltons) | Polydispersity Index |
|---|---|---|---|---|---|---|---|
| 1 | 50 | 50 | 2-ethylhexyl acrylate (3 parts by wt.) | 95 | 137 | 2200 | 2.4 |
| 2 | 50 | 50 | — | 98 | 105 | 1372 | 2.6 |
| 13 | 50 | 50 | Butyl methacrylate (5 parts by wt.) | 95 | 145 | 2230 | 3.1 |
| 14 | 50 | 50 | isopropyl acetate (5 parts by wt.) | 0.00 | — | — | — |
| 15 | 50 | 50 | ethyl acetate (5 parts by wt.) | 0.00 | — | — | — |
| 16 | 50 | 50 | ethyl acetate (2 parts by wt.) | 95 | 115 | 1264 | 2.4 |
| 17 | 50 | 50 | tertbutylacetate (1 part by wt.) | 96 | 104–105 | 490 | 10.8 |
| 18 | 50 | 50 | terbutylacetate (2 parts by wt.) | 96 | 102–103 | 526 | 6.0 |
| 19 | 50 | 50 | terbutylacetate (5 parts by wt.) | 0.00 | — | — | — |

As illustrated by the foregoing examples, when more than about 3 parts by weight saturated ester complex is used to make the catalyst complex (Examples 14, 15 and 19), the catalyst is completely poisoned and the polymerization reaction does not take place. At about 1 to 2 parts of saturated ester complex (Examples 16–18), a reaction occurs but the softening point is substantially lower than resin made using the unsaturated ester/catalyst complex, and the yield is generally lower.

EXAMPLES 20–25

Adhesive formulations made with the polymer of Example 1 (Examples 21–23) were compared with adhesive formulations containing commercially available resins (Examples 24–25) in the following examples. The amount of each ingredient and the characteristics of the adhesive formulation are given in Table 4.

TABLE 4

| Ingredient (parts by wt.) | Example #20 | Example #21 | Example #22 | Example #23 | Example #24 | Example #25 |
| --- | --- | --- | --- | --- | --- | --- |
| PRIMOL 352 | 15 | 15 | 15 | 15 | 15 | 15 |
| ESCOREZ 1310 | 45 | 45 | 45 | 45 | 45 | 45 |
| KRATON 1107 | 25 | 25 | 25 | 25 | 25 | 25 |
| Polymer Example #1 | — | 5 | 15 | 25 | — | — |
| ENDEX 160 | — | — | — | — | 15 | — |
| KRISTALLEX 3115 | — | — | — | — | — | 15 |
| Shear Test at 75° C. (minutes) | 55 | 195 | 500 | 330 | 120 | 270 |
| Loop Tack (N/25 mm) | 17 | 17 | 18 | 14 | 14 | 17 |
| Peel Adhesion (N/25 mm) | 15 | 13 | 13 | 11 | 15 | 19 |
| SAFT Test (°C.) | 96 | 103 | 103 | 104 | 100 | 98 |

As illustrated by the foregoing examples, adhesives containing the copolymer made according to the invention exhibit comparable or better loop tack, peel adhesion and SAFT test results with respect to commercially available resins, and have greatly improved shear properties.

Although preferred embodiments of the present invention have been described in the foregoing detailed description, it will be appreciated by those of ordinary skill in the art that the invention is capable of numerous modifications, rearrangements and substitutions without departing from the spirit and scope of the invention as defined in the appended claims.

What is claimed is:

1. A process for polymerizing monomer which comprises dissolving monomer selected from the group consisting of vinyl aromatic monomers, dicyclopentadiene compounds, terpene compounds, ethylene, isobutylene, vinyl ether monomers and mixtures of two or more of the foregoing in an organic solvent, providing in the solvent a catalyst complex consisting essentially of an ester of an unsaturated carboxylic acid and a Lewis acid, and reacting the monomer in the solvent containing the catalyst complex at a temperature ranging from about 5° to about 50° C. to produce a polymeric resin thereof having a softening point above about 125° C., a number average molecular weight in the range of from about 1100 to about 4000 and a polydispersity index of from about 2.0 to about 4.5.

2. The process of claim 1, wherein the Lewis acid is selected from the group consisting of boron trifluoride, boron trichloride, aluminum trichloride, aluminum tribromide, alkyl aluminum chlorides, titanium tetrachloride, attapulgite, montmorillonite, and tin tetrachloride.

3. The process of claim 1, wherein the Lewis acid is boron trifluoride or aluminum trichloride.

4. The process of claim 1, wherein the ester is selected from the group consisting of 2-ethylhexyl acrylate, butyl acrylate, methylacrylate and butyl methacrylate.

5. The process of claim 1, wherein the unsaturated carboxylic acid is selected from a group consisting of methacrylic acid, maleic acid and fumaric acid.

6. The process of claim 1, further comprising polymerizing the monomer in the presence of a phenolic compound wherein the phenolic compound is copolymerized at a weight percentage of no more than about 3% relative to the total amount of monomer.

7. The process of claim 6, wherein the phenolic compound is selected from the group consisting of monophenol, diphenol, trialkylphenol and alkoxyphenols.

8. The process of claim 1, wherein the polymeric resin has a Ring and ball softening point in the range from about 130° C. to about 185° C. and a Gardner color of below about 1.0.

9. The process of claim 1, wherein the molar ratio of ester to Lewis acid ranges from about 0.5:1.0 to about 5.0:1.0.

10. The process of claim 1, wherein the organic solvent is selected from the group consisting of toluene, xylene, pentane, heptane, and hexane.

11. The process of claim 1, wherein the catalyst complex is a $BF_3$-acrylate complex.

12. The process of claim 1, wherein the weight percent of catalyst complex to monomer ranges from about 0.1 to about 5.0 wt. %.

13. The process of claim 1 wherein the catalyst complex is provided in the solvent by dissolving the ester in the solvent and then contacting the solvent containing the dissolved ester with the Lewis acid.

14. A process for cationic polymerization of vinyl aromatic monomer which comprises dissolving a vinyl aromatic monomer in an organic solvent which contains a catalyst complex consisting essentially of an ester of an unsaturated carboxylic acid and a Lewis acid, and reacting the monomer in the solvent containing the complex at a temperature ranging from about 5° to about 50° C. to produce a resin thereof having a softening point above about 125° C., a number average molecular weight in the range of from about 1100 to about 4000 and a polydispersity index of from about 2.0 to about 4.5.

15. The process of claim 14, wherein the Lewis acid is selected from the group consisting of boron trifluoride, boron trichloride, aluminum trichloride, aluminum tribromide, alkyl aluminum chlorides, titanium tetrachloride, attapulgite, montmorillonite, and tin tetrachloride.

16. The process of claim 14, wherein the Lewis acid is boron trifluoride or aluminum trichloride.

17. The process of claim 14, wherein the ester is selected from the group consisting of 2-ethylhexyl acrylate, butyl acrylate, methylacrylate and butyl methacrylate.

18. The process of claim 14, wherein the unsaturated carboxylic acid is selected from a group consisting of methacrylic acid, maleic acid and fumaric acid.

19. The process of claim 14, wherein the vinyl aromatic monomer is selected from the group consisting of styrene, alpha-methylstyrene, ortho-methylstyrene, para-methylstyrene, meta-methylstyrene, vinyl toluene, indene, methyl indene and mixtures thereof.

20. The process of claim 14, further comprising polymerizing the monomer in the presence of a phenolic compound wherein the phenolic compound is copolymerized at a weight percentage of no more than about 3% relative to the total amount of monomer.

21. The process of claim 20, wherein the phenolic compound is selected from the group consisting of monophenol, diphenol, trialkylphenol and alkoxyphenols.

22. The process of claim 14, wherein the polymeric resin has a Ring and ball softening point in the range from about 130° C. to about 185° C. and a Gardner color of below about 1.0.

23. The process of claim 14, wherein the molar ratio of ester to Lewis acid ranges from about 0.5:1.0 to about 5.0:1.0.

24. The process of claim 14, wherein the organic solvent is selected from the group consisting of toluene, xylene, pentane, heptane, and hexane.

25. The process of claim 14, wherein the catalyst complex is a $BF_3$-acrylate complex.

26. The process of claim 14, wherein the weight percent of catalyst complex to monomer ranges from about 0.1 to about 5.0 wt. %.

27. The process of claim 14 wherein the catalyst complex is provided in the solvent by dissolving the ester in the solvent and then contacting the solvent containing the dissolved ester with the Lewis acid.

28. A process for cationic polymerization of styrenic monomer which comprises dissolving styrene and/or alpha-methyl styrene in an organic solvent containing 2-ethylhexylacrylate or butylacrylate and contacting the solution with gas-phase boron trifluoride to cause in situ formation of a catalyst complex of the boron triflouride and acrylate and reacting the monomer in the presence of the in situ complex to provide a polymeric resin having a ring and ball softening point above about 125° C. and a polydispersity index above about 2.0.

29. The process of claim 28, wherein the polymeric resin has a Ring and ball softening point in the range from about 130° C. to about 185° C. and a Gardner color of below about 1.0.

30. The process of claim 28, wherein the reaction is conducted at a temperature ranging from about 5° to about 50° C.

31. The process of claim 28, wherein the molar ratio of ester to boron trifluoride ranges from about 0.5:1.0 to about 5.0:1.0.

32. The process of claim 28, wherein the organic solvent is selected from the group consisting of toluene, xylene, pentane, heptane, and hexane.

33. The process of claim 28, wherein the catalyst complex is a $BF_3$-acrylate complex.

34. The process of claim 28, wherein the weight percent of complex in the solution ranges from about 0.1 to about 5.0 wt. %.

35. A processing aid for thermoplastic polymers which is made by dissolving styrene and/or alpha-methylstyrene in an organic solvent containing 2-ethylhexyl acrylate or butyl acrylate and contacting the solution with gas-phase boron trifluoride to cause in situ formation of a catalyst complex of the boron triflouride and acrylate and reacting the monomer in the presence of the catalyst complex to provide the processing aid which exhibits a ring and ball softening point above about 125° C. and a polydispersity index above about 2.0.

36. The processing aid of claim 35, wherein the processing aid has a Ring and ball softening point in the range from about 130° C. to about 185° C. and a Gardner color of below about 1.0.

37. The processing aid of claim 35, wherein the reaction is conducted at a temperature ranging from about 5° to about 50° C.

38. The processing aid of claim 35, wherein the aromatic solvent is selected from the group consisting of toluene, xylene, pentane, heptane, and hexane.

39. The processing aid of claim 35, wherein the catalyst complex is $BF_3$-2-ethylhexyl acrylate or $BF_3$-butyl acrylate complex.

40. The processing aid of claim 35, wherein the weight percent of complex to styrene or alpha-methylstyrene in the solution ranges from about 0.1 to about 5.0 wt. %.

* * * * *